United States Patent [19]

Johnstone et al.

[11] 4,425,590

[45] Jan. 10, 1984

[54] VIDEO CASSETTE RECORDER

[76] Inventors: Gregg M. Johnstone, R.F.D. 2, Squash Hollow Rd., New Milford, Conn. 06776; Harry Davies, #6 Acre Dr., Danbury, Conn. 06810

[21] Appl. No.: 317,293

[22] Filed: Nov. 2, 1981

[51] Int. Cl.³ ............................................. G11B 5/008
[52] U.S. Cl. ........................................ 360/71; 360/85; 360/95
[58] Field of Search ............................ 360/71, 85, 95

Primary Examiner—George G. Stellar
Attorney, Agent, or Firm—Weingram & Klauber

[57] ABSTRACT

A video tape recorder designed so that the time for placing the tape in position to record and play-back and for activating the tape movement is materially reduced. Upon the cassette being inserted into the recorder, the tape is withdrawn and immediately positioned proximate to the record/reproduce heads. The reel torque on the supply side is increased, and the capstan shaft activated to accelerate the tape to its normal speed. This is accomplished by instructing the microprocessor in a conventional machine to perform different functions that it was designed to perform, i.e. to enter the play mode directly upon cassette insertion while shutting off the capstan motor and connecting the video output to the video input through a relay. Supply tension is also reduced. Only after the play mode is selected is the capstan activated, the supply tension returned to normal value, and the video input decoupled from the video output. This sequence results in material saving of time to ready the machine to record/reproduce.

14 Claims, 3 Drawing Figures

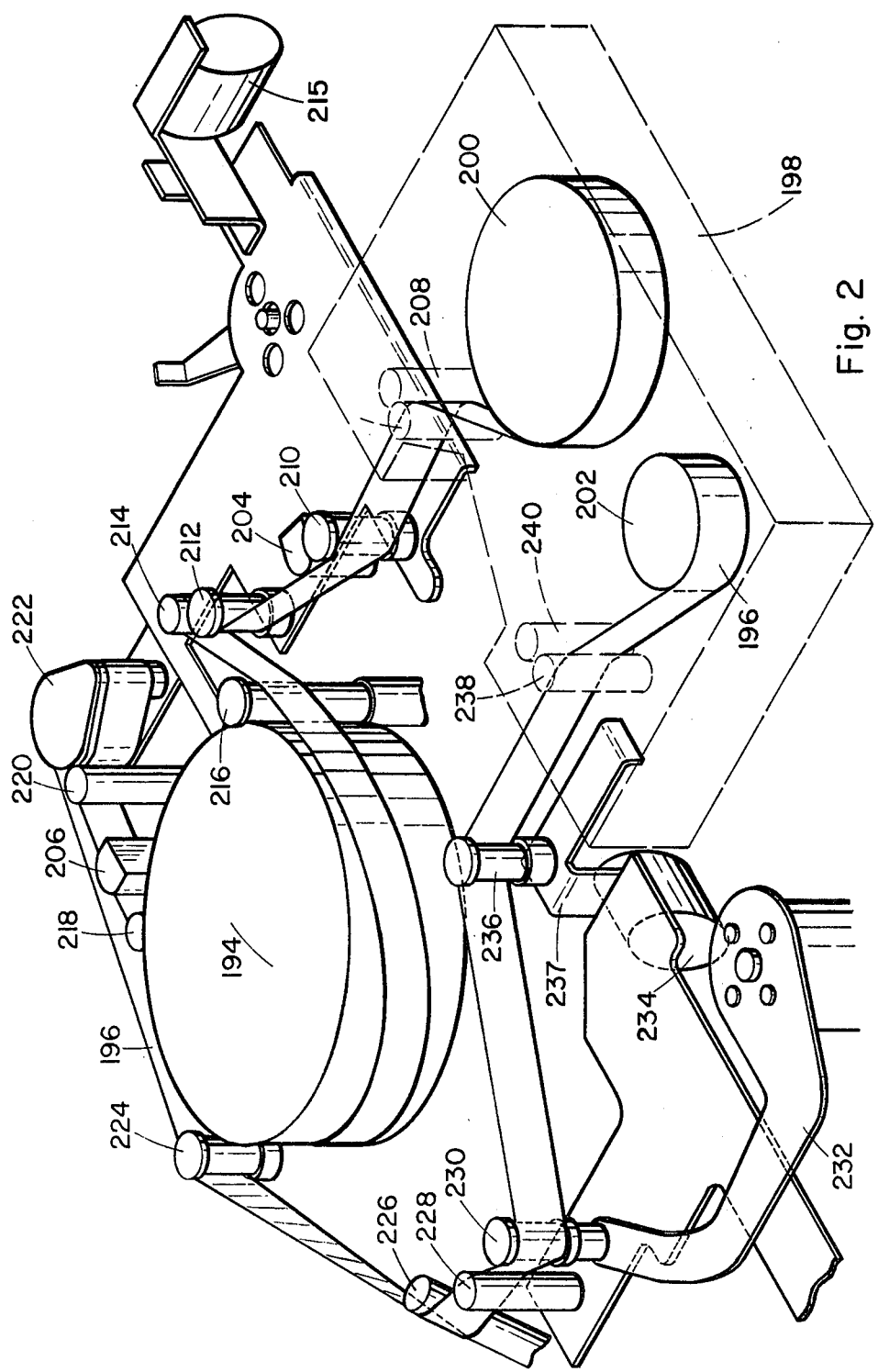

VIDEO CASSETTE RECORDER

FIELD OF INVENTION

This invention relates to a video cassette tape recorder for recording and/or reproducing video signals in a recording medium, and in particular to a tape transport control for automatically placing a tape in position for recording or reproduction after insertion of a tape cassette into the recording device.

BACKGROUND OF THE INVENTION

Video tape cassette recorders (VCR's) are widely used to record and/or reproduce video signals on a recording medium (tape).

In certain fields of application, as for example in the medical field, it is desirable not only to simplify the operation of the recorder, but also to reduce the time interval between the instant at which the RECORD mode is activated and actual recording commences. Similar considerations apply to the interval between actuation of the PLAY mode and commencement of play-back.

An example of this occurs in x-ray fluoroscopy employing an adjacent video cassette recorder where activation of the RECORD mode begins at the same time the x-ray apparatus is activated. By minimizing the time of activation of the VCR, the patient can be exposed to substantially less harmful radiation.

In currently available video cassette recorders, the tape cassette is inserted into a cassette holder which is retracted into the machine. Mechanical fingers then withdraw the tape into a position where reel brakes are applied.

In the conventional VCR, this position is referred to as the "STOP" mode.

In the "STOP" mode, the machine is in its stand-by state, i.e., nothing further happens until a function button is depressed. The function buttons are: STOP, FORWARD, REVERSE, PAUSE, PLAY, RECORD, AND EJECT. The mechanical functions of these states in a conventional VCR are as follows:

1. The STOP mode has been described above.
2. FORWARD:
   A. Reel brakes are released.
   B. Torque on the reels is adjusted so that the tape is accelerated in a forward direction at a high rate of speed.
3. REVERSE:
   A. Reel brakes are released.
   B. Torque on the reels is adjusted so that the tape is accelerated in the reverse direction at a high rate of speed.
4. PLAY:
   A. Take-up reel brakes are released and torque on the take-up reel is adjusted for proper tape tension.
   B. Mechanical fingers withdraw additional tape from the tape cassette and transfer it to the thread ring.
   C. The thread ring pulls the tape around the play-/record heads and then to the capstan shaft.
   D. A solenoid is activated to engage the pinch roller which pinches the tape between a rubber roller and the rotating capstan shaft. At the same time, the supply reel brakes are released and tension is adjusted for approximately 75 g.
   E. The capstan shaft accelerates the tape up to a tape speed of 9.53 cm/sec and maintains this speed during the play-back mode. The average time required to begin playing back prerecorded information on the tape is approximately between 3-5 seconds.
5. PAUSE:
   A. The machine must be in the play mode before the pause mode can be activated.
   B. The pinch roller is released from the capstan shaft causing the tape to stop moving.
6. RECORD:
   The sequence of steps in the RECORD mode is identical to those listed for the PLAY mode. It still requires 3-5 seconds before the machine is actually recording information which is too long an interval for many applications and can result in a loss of information.
7. STOP:
   A. The pinch roller is disengaged from capstan shaft, stopping tape movement.
   B. Torque on the reels is adjusted so that the take-up reel rewinds tape onto it and the supply reel is locked.
   C. The thread ring is activated to guide tape off the record/play heads, then transfers it to mechanical fingers which retract into the stop position.
8. EJECT:
   A. Mechanical fingers insert tape into tape cassette.
   B. The tape cassette in elevated from the machine.
   C. The tape cassette is ejected from the tape cassette holder.

SUMMARY OF INVENTION

In the video cassette recorder (VCR) according to the invention, the time to go from STOP mode to the PLAY-BACK or RECORD mode is materially reduced. This is accomplished as follows:
1. The tape cassette is inserted into the machine.
2. The cassette holder is retracted into the machine.
3. The take-up (TU) reel brake is released and torque on the reel is adjusted for suitable tape tension.
4. Mechanical fingers withdraw tape into the machine and then transfer it to the thread ring.
5. The thread ring pulls tape around over the play-/record heads and then to the stationary capstan shaft.
6. A solenoid is activated to engage the pinch roller which pinches the tape between a rubber roller and the stationary capstan shaft.
7. Tension on the tape is then adjusted to approximately 3-4 grams on the supply reel side and 60-100 grams on the take-up reel side.

The tape is now parked in a mode that except as hereinafter noted will be referred to as the "STOP" mode. The length of time to place the tape in this position is 3-5 seconds. The machine is now ready for recording or playback. It will be appreciated that the term "STOP" mode, as it refers to the present apparatus references to a configuration which differs from the configuration of a conventional machine when in a "STOP" mode. Such conventional configuration has been heretofore described.

In order to play-back and/or record, the following sequence takes place:
   A. The reel torque on the supply side is increased up to 75 grams.

B. The capstan shaft is activated which accelerates the tape to 9.53 cm/sec.

The length of time to bring the tape from the STOP mode to the play-back and/or recording mode is now only approximately 250 milliseconds.

To stop the tape, i.e., bring the machine to a STOP position, the capstan shaft is electronically braked to zero rotation and the supply reel torque adjusted to reduce the tape tension to 3-4 grams. The length of time for the machine to enter this mode is approximately 100 milliseconds.

The machine also has several other functions which are:

PAUSE:
  Can only be entered if the machine is initially in the play mode. When the pause button is depressed, the capstan shaft is electronically braked to zero. Tensions remain as they were in the PLAY mode.

FORWARD and REVERSE SLOW MOTION:
  These modes can only be entered from the PAUSE mode. While in the PAUSE mode, if the FORWARD or REVERSE buttons are depressed, and held in the capstan shaft will begin to rotate at the rate of approximately 1 video field per 2 seconds in the forward (or reverse) direction, then will accelerate to approximately 1/5 normal speed. This gradual acceleration from stop to 1/5 normal speed takes approximately 5 seconds.

FORWARD/REVERSE:
  A. The pinch roller is disengaged from the capstan shaft.
  B. The supply reel is locked.
  C. The thread ring is activated to guide the tape off the record/play heads, then transfers it to mechanical fingers which retract it away from the record/play heads.
  D. The supply reel brake is released.
  E. Torque on the reels is adjusted so that the tape is accelerated in the forward (or reverse) direction at a high rate of speed.
  F. When the STOP button is depressed or the end of the tape is reached, the following sequence takes place:
    1. Torque on the reels is adjusted so that the tape is smoothly brought to a halt.
    2. The supply reel is locked.
    3. Mechanical fingers transfer tape to the thread ring which guides the tape around the play/record heads and then to the stationary capstan shaft.
    4. A solenoid is activated to engage the pinch roller which pinches the tape between a rubber roller and the stationary capstan shaft. The machine is now in the STOP mode once again.

EJECT:
  From the REVERSE or FORWARD mode the EJECT mode is identical to that of the conventional machine.

Likewise, from either the PLAY or RECORD modes the EJECT mode follows the sequence for FORWARD or REVERSE and then that of the known machine.

The logic for effecting these sequences are partially incorporated in a micro-processor.

OBJECTS OF THE INVENTION

An object of the present invention is accordingly to provide a tape transport control for a video cassette recording and reproducing device, enabling the recording medium to be in readiness for play-back or recording without significant loss of time.

A further object of the invention is to provide a video cassette recorder for applications wherein recording of images is facilitated without loss of significant information due to load and unload times.

These and further objects of the invention will appear as the specification progresses. The invention will be described in connection with a preferred embodiment from which the foregoing objects and other advantages will appear. However, the invention is not limited to this particular embodiment, but is defined in the following claims.

BRIEF DESCRIPTION OF THE DRAWING

The invention will be described with reference to the accompanying drawing in which.

DETAILED DESCRIPTION OF PREFERRED EMBODIMENT

A video cassette recorder (VCR) in accordance with the invention, comprises a tape transport mechanism (FIG. 2) and suitable means for withdrawing the tape into, and guiding the tape around a cylinder containing the video record/play heads.

Figure 1:
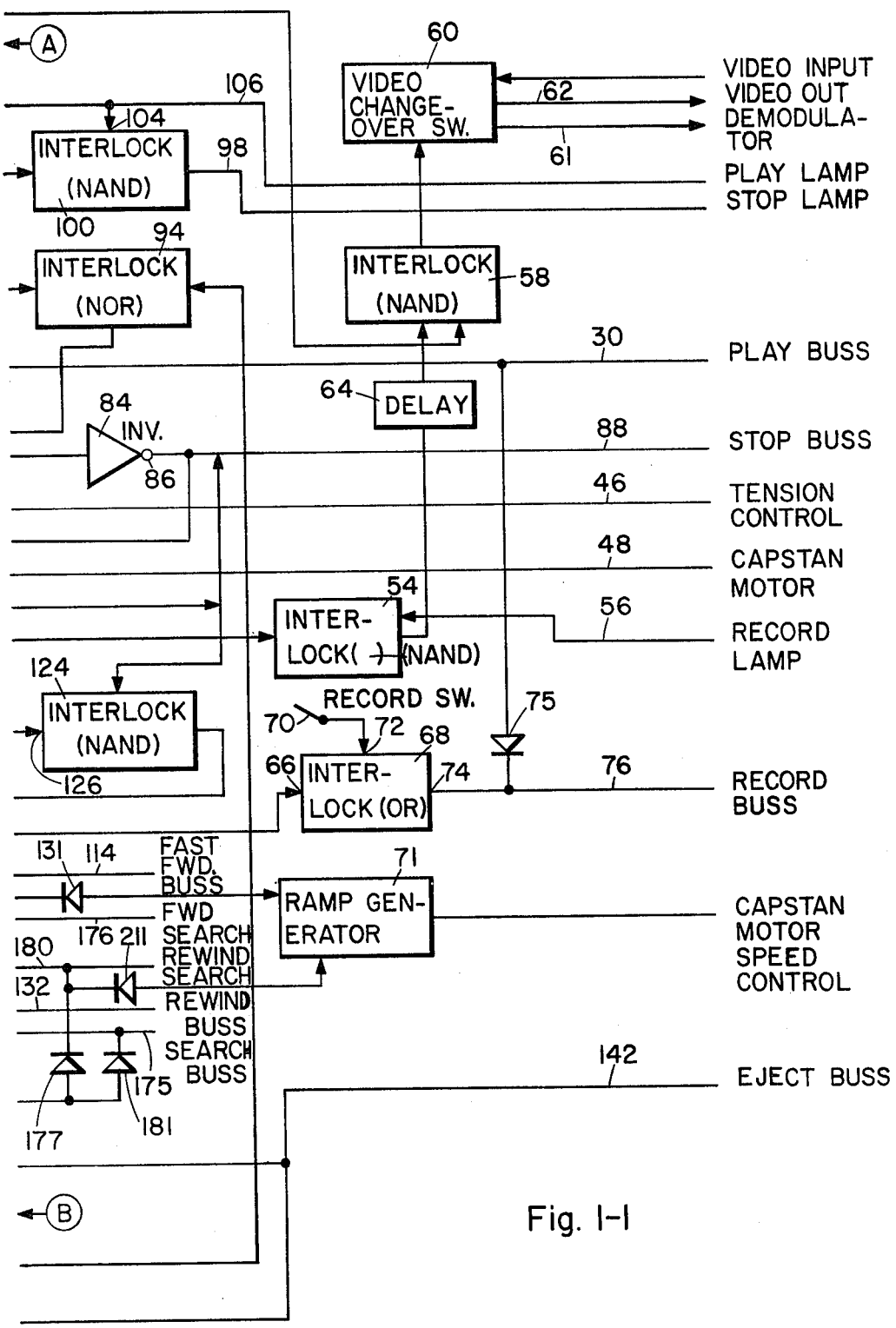
FIG. 1, shown as FIGS. 1—1 and 1-2 is a schematic drawing of a circuit used to control the operation of the video cassette recorder according to the invention.
Figures 1, 2:
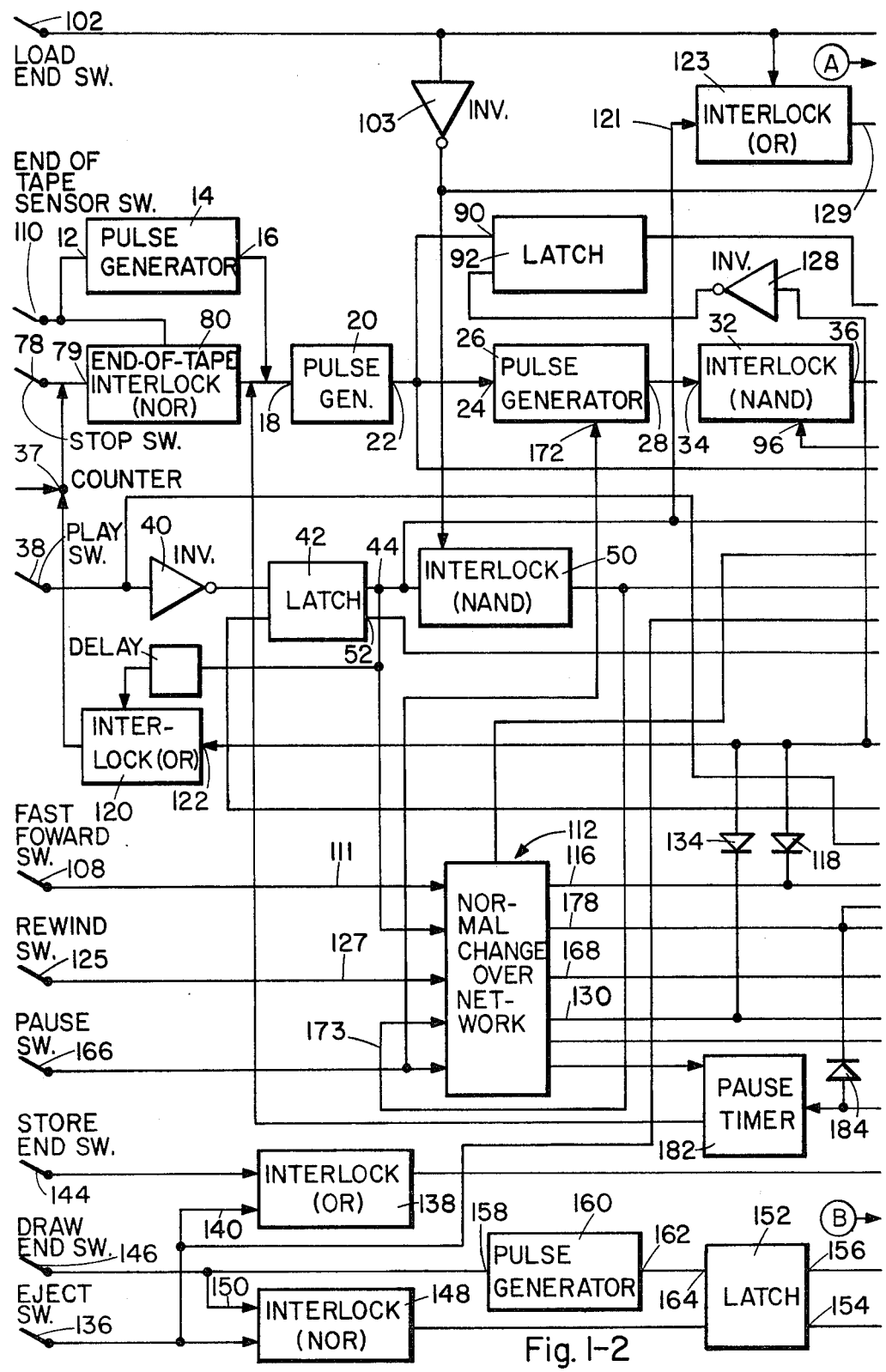
FIG. 2 is a plan view, in perspective, showing the tape transport mechanism for the video cassette recorder embodying the invention.

A number of operations must be performed after a cassette holding the tape is placed in a cassette holder (see FIG. 2). Briefly, when the cassette is placed in the cassette holder, fingers withdraw the tape which is then threaded through the machine around a cylinder and positioned for play-back or recording. The tape is then in the STOP mode.

The machine may then be activated for either play-back or recording. During play-back, information on the tape is converted to an electrical signal by the recording/play-back heads while the tape is transported past the heads. This electrical signal is demodulated and processed to produce a visual image.

Likewise, during recording, a video signal generated by a camera or like video signal producing device coupled to the recorder is modulated into an r-f signal and recorded on the tape as it passes the recording heads.

Since the tape may already have information recorded thereon, during the recording the tape passes an erase head which is activated to erase any signals in the tape before passing the recording heads.

It may be desired, to position the tape to a particular section. Accordingly, provision is made to advance the tape by moving the tape rapidly in the forward direction, otherwise referred to as the FORWARD mode. Likewise, it may be desired to return rapidly to an earlier section and this is done by moving the tape rapidly in a reverse direction or the REVERSE mode.

It may be desired to view a particular field during playback, and for this purpose, a pause control is provided.

It may also be desired to view a particular section of tape in slow motion—this can be either in a forward or reverse sense. When in this mode, the FORWARD and REVERSE buttons function as slow motion controls.

Other functions are to stop the tape movement, to rewind the tape, and finally upon completion of the unthreading process to eject the cassette from the machine.

Each of these functions will be described with reference to FIG. 1, which shows in detail the circuit for controlling the tape transport mechanism, a portion of which is shown in FIG. 2.

Only essential elements and details of the VCR according to the invention have been shown in the drawing to simplify the understanding of the machine and its operation. It is to be understood that other features may be incorporated, and even modifications made therein without departing from the scope of the invention which is pointed out in the claims.

Referring to FIG. 1 of the drawing, the circuit shown there instructs a microprocessor, already contained in the machine to perform different functions than it was originally designed to do. Thus, when the tape is inserted into the machine, the microprocessor is instructed by this circuit to go into PLAY mode—as that term was defined for a conventional machine. However, in the present apparatus, the capstan motor is turned off and the video input is connected to the video output through a relay; also the supply tension is reduced (to eliminate play/record head to tape contact, thus eliminating head wear and tape damage). After the tape is loaded and the PLAY button depressed, the capstan motor is activated, tension is set to normal and the video output is connected to the demodulator circuit.

When any mode except PAUSE or RECORD is selected from the front panel controls, the circuit momentarily activates the STOP mode, then the selected function is initiated. When the STOP button is depressed, the microprocessor is instructed to momentarily enter the (conventional) STOP mode, then enter the (conventional) PLAY mode—but with the capstan off and decreased supply tension.

The circuit will be described by referring to the various operations to be programmed.

A. INSERTING TAPE INTO MACHINE TO ENTER STOP MODE

When tape is inserted into the machine, the end of tape sensor 110 is triggered and produces a low-to-high transition, which appears at the input 12 of pulse generator 14. The output 16 of pulse generator 14 produces a positive-going pulse of approximately one-second duration, which appears at the input 18 of pulse generator 20. Pulse generator 20 produces a positive-going pulse approximately one-half second duration appearing at the output 22. The pulse generated by pulse generator 20 appears at the input 24 of pulse generator 26 which produces a pulse of approximately three seconds duration which appears at the output 28 of pulse generator 26 and causes PLAY buss 30 to go low through interlock 32 (NAND) which has an input terminal 34 directly connected to the output 28 of pulse generator 26 and an output terminal 36 to which the PLAY buss is connected. Interlock 32 inhibits the PLAY pulse if the machine is in the EJECT, FAST FORWARD or REWIND modes.

B. PLAY MODE

With the tape inserted into the machine and wrapped around the play/record heads, the capstan motor will not be running. The PLAY mode activates the capstan motor in the following manner:

When the PLAY switch 38 is depressed, it creates a high-to-low transition which passes through inverter 40 and sets latch 42. Output 44 of latch 42 goes low which deactivates tension control 46. It also activates the capstan motor 48 through interlock 50 (NAND) only if the LOAD END switch 102 is activated. By "load end" is meant the condition whereby the tape is threaded completely around the cylinder assembly. Outuput 44 of latch 42 is also coupled to interlock 123 via input 121. If the LOAD END SW is activated, then interlock 124 output 129 goes low and activates the play lamp. If the play lamp is lit then interlock 100 is inhibited, thus shutting off the stop lamp. Output 52 of latch 42 is coupled through interlock 54 (NAND), (unless the record lamp 56 is lit) to interlock 58 (NAND), via delay network 64, and then to video change-over switch 60, which switches the video output 62 from LOOP THROUGH to PLAY mode. Interlock 58 inhibits relay switch 60 command until the machine is in the LOAD END mode.

A delay circuit 64 between interlock 54 and interlock 58 inhibits change-over switch 60 from switching for about 500 milliseconds. This allows time for the recorder servo motors (not shown) to fully synchronize before switching the relay.

C. RECORD MODE

The RECORD mode can only be entered when the PLAY and RECORD buttons are depressed together. When the PLAY switch 38 is depressed, a low level is presented to input terminal 66 of interlock 68 (OR). When the RECORD switch 70 is depressed, a low is presented at input terminal 72 of interlock 68 causing output terminal 74 to drop to a low which activates RECORD buss 76. Diode 75 is required to insure that the microprocessor (not shown) has two lows simultaneously on the RECORD and PLAY busses. The microprocessor will then activate the record lamp 56, which inhibits changeover switch 60 from switching through interlock 54.

D. STOP MODE

When STOP switch 78 is depressed, a high-to-low transition is coupled through interlock 80 provided that end-of-tape sensor 110 is low. This transition, inverted by end-of-tape sensor interlock (NOR) 80, triggers pulse generator 20 through input terminal 18 producing a pulse at output terminal 22 which is coupled through invertor 84 whose output 86 is coupled to STOP buss 88. Output terminal 22 of pulse generator 20 is also coupled to pulse generator 26 which triggers the PLAY buss 30 through interlock 32. The longer time out of pulse generator 26 insures that after the STOP buss has received a pulse, the PLAY buss will still be activated for a short time so that the tape will remain threaded. A pulse from pulse generator 20 also appears at input terminal 90 of latch 92. Latch 92 enables interlock 32 through interlock 94 via input terminal 96 of interlock 32 and allows pulses from pulse generator 26 to reach PLAY buss 30. STOP lamp 98 will be lit through interlock 100 only when the LOAD END mode switch 102 is activated. However, the STOP LAMP will be inhibited through input terminal 104 of interlock 100 whenever PLAY LAMP 106 is lit. STOP LAMP 98 will be prevented from lighting by inverter 103 whenever the LOAD END Mode switch 102 is not activated.

E. FORWARD MODE

Figure 1A:
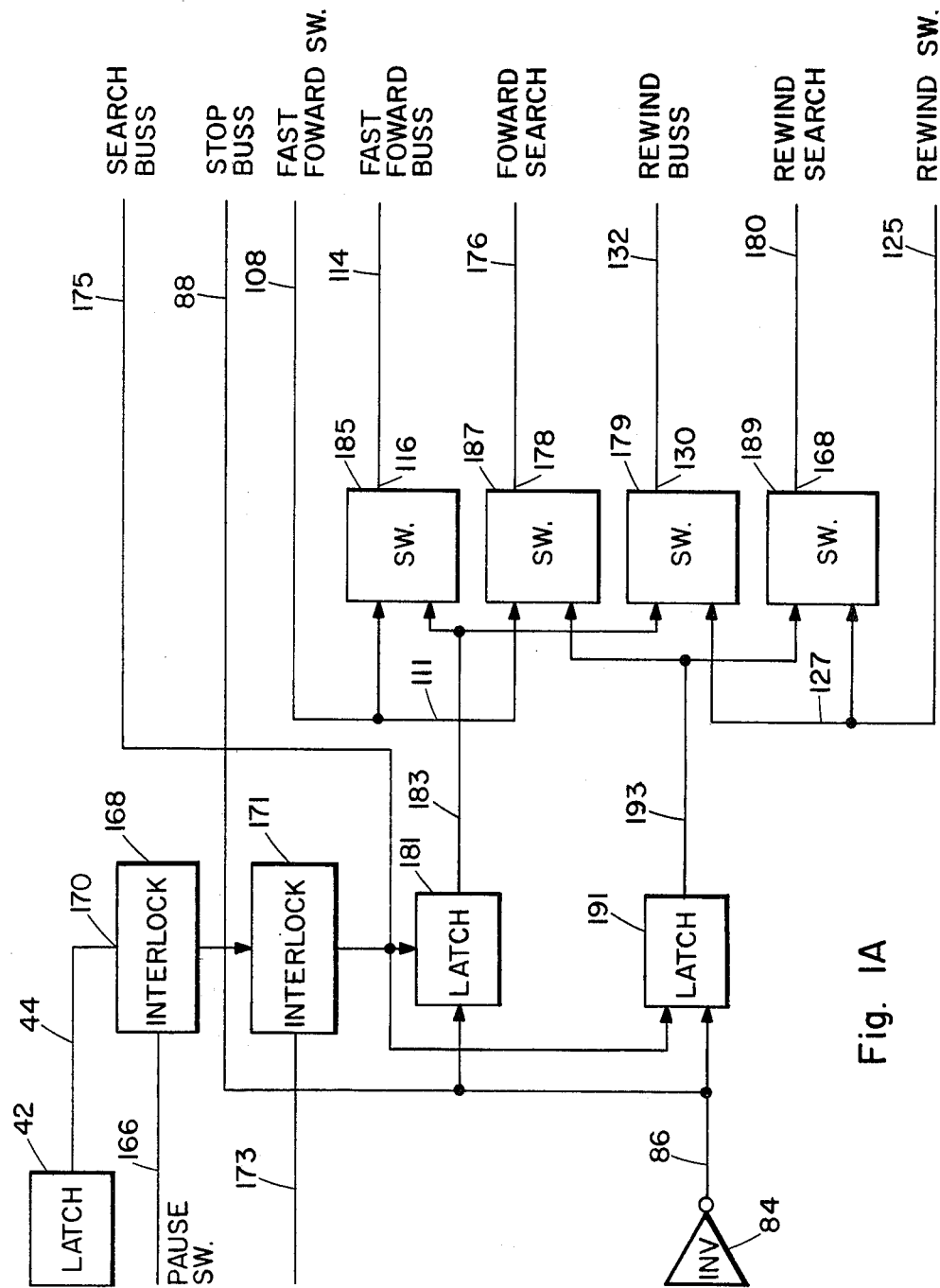
FIG. 1a is a schematic drawing of the change-over network in FIG. 1.

When the Fast Foward switch 108 is depressed, a low is coupled through input terminal 111 of NORMAL CHANGE OVER NETWORK 112 (See FIG. 1A) which activates FAST FORWARD buss 114 through a low on output terminal 116. Diode 118 (FIG. 1) connected to output terminal 116 pulls interlocks 120 (OR) and 124 (NAND) via input terminals 122 and 126 low and resets latch 92 through inverter 128. Latch 92 causes an inhibit pulse to appear at input 96 of interlock 32. This prevents any pulses from activating the PLAY buss when the FORWARD buss is activated. The output of interlock 120 provides a STOP pulse into the pulse generator 20 by coupling through interlock 80. This STOP pulse is inhibited by interlock 120 if the machine is in the PLAY mode. Interlock 124 causes latch 42 to reset, thus shutting off CAPSTAN MOTOR 48 and causing video change-over switch 60 to switch from PLAY mode to LOOP THROUGH mode.

F. REWIND MODE

When Rewind Switch 125 is depressed it causes a low at terminal 127 of change-over network 112. Output terminal 130 is coupled directly to REWIND buss 132. REWIND buss 132 is also connected through diode 134 to interlocks 120 and 124, and inverter 128 and performs the same functions as those components in the FORWARD mode.

G. EJECT MODE

Whenever EJECT switch 136 is depressed, it causes a low to activate STOP buss 88 via direct connection. If there is no tape in the cassette holder, as detected by store end switch 144, then when EJECT switch 136 is depressed, the low signal is coupled into interlock 138 through input terminal 140 and then on to EJECT buss 142. Interlock 138 (OR) inhibits this pulse unless the STORE END switch 144 is depressed. Switch 144 activates when the mechanical fingers that withdraw the tape from the cassette are in their store position.

If there is tape in the machine and DRAW END switch 146 is activated, then interlock 148 (NOR) to which switch 146 is connected through input terminal 150 resets latch 152.

This will cause output 154 of the latch to hold EJECT buss 142 low forcing the machine into the EJECT mode. It will also cause output 156 to latch high, inhibiting any pulses from reaching PLAY buss 30 through interlock 94 and interlock 32. As the machine unthreads and passes the DRAW END switch 146, a low-to-high transition is presented at the input terminal 158 of pulse generator 160, the output 162 is coupled to input 164 of latch 152. This causes latch output 154 and 156 to reverse states, thus opening interlocks 94 and 32 and releasing EJECT buss 142.

H. PAUSE MODE

The pause mode can only be entered from the PLAY mode because PAUSE switch 166 (Reference FIG. 1A) is inhibited by latch 42 whenever it is in the set condition. PAUSE switch 166 is connected to interlock 168. Input terminal 170 is connected to latch 42.

If the machine is in the PLAY mode when the PAUSE switch is depressed, a low appears at input 170 of interlock 168 and at the input terminal 172 of pulse generator 26. The output of interlock 171 enables search buss 175, thus braking the capstan motor to a stop. This low at input terminal 172 resets pulse generator 26. This is necessary to prevent PLAY buss 30 and SEARCH buss 175 from being simultaneously activated if pulse generator 26 has not timed out.

The pause mode causes the capstan motor to brake to a stop, via search buss 175, thus, stopping tape motion, and holding one video field on the monitor. The pause mode is inhibited unless the machine is in the play mode initially. When in the PAUSE-mode, if the forward button or the rewind button is depressed, the capstan motor is accelerated in the forward or the reverse mode, up to 1/5 normal speed.

FORWARD AND REVERSE SEARCH MODE

When the PAUSE switch 166 is depressed, a high to low voltage transition is coupled into interlock 168 of the change-over network 122 (See FIG. 1a), which inhibits its output, if latch 42 is in the set condition. If latch 42, is not in the set condition, then the pause voltage level shift is sent on to interlock 171, which inhibits any level changes at its output, if interlock 50, via input 173, is in its inhibit condition (i.e. load end switch 102 is not activated). If interlocks 168 and 171 allow the voltage transitions to pull the search buss 175 low, they also will set latches 181 and 191, causing their outputs 183 and 193 to go high.

If FORWARD switch 108 is depressed, a high to low voltage transition is presented to switches 185 and 187, via input 111. If latches 181 and 191 are set, then switch 185 will inhibit any voltage transitions to the fast forward buss 114, and switch 187 will allow a voltage transition at the FORWARD SEARCH buss 176. Conversely, if latches 181 and 191 are in their reset condition (i.e. 183 and 193 low), then switch 187 will inhibit any changes to FORWARD SEARCH buss 176, and switch 185 will allow a voltage transition at the FORWARD buss 114.

If rewind switch 125 is depressed, a high to low voltage transition is presented to switches 179 and 189. If latches 181 and 191 are in their set condition, (i.e. 183 and 193 are high) then switch 179 will inhibit any voltage transitions to the rewind buss 132, and switch 189 will allow a voltage transition at the REWIND SEARCH buss 175.

A voltage transition at pulse generator 20 (stop command) causes latches 181 and 191 to reset via inverter 84.

The pause timer 182 will time out after approximately one and one-half minutes after which it sends a pulse to input terminal 18 of pulse generator 20 causing the machine to go into STOP mode. This prevents damage to the tape and heads if for any reason there is no tape movement for one and one-half minutes.

It the SEARCH buss goes low during this one and one-half minute time out, the pause timer resets via diodes 184, 177, or 181, and activates once again.

If the machine is in the PAUSE mode then any level changes at input terminals 111 and 127 of change-over network 112 will be transferred to output terminals 178 and 168. Therefore, if the FORWARD switch is depressed, a low will appear at input terminal 111. This will cause output terminal 178 which is connected to the FORWARD SEARCH, buss 176 to go low. It will also reset and hold PAUSE timer 182 to zero for the duration of the low via diodes 131 and 184. Also the low at 178 is coupled through a diode 211 to ramp generator 71 which starts a ramp signal that controls the speed of capstan motor (not shown). The longer the low is maintained, the faster the capstan motor goes, up to a limit of approximately 1/5 normal speed.

Operation of the REVERSE SEARCH mode is similar to that of the FORWARD SEARCH mode.

J. VIDEO CHANGE-OVER RELAY

In all modes except PLAY, this relay by-passes the video input and output. During the PLAY mode the relay connects the video output to the demodulator circuit 186 and connects the input to a 75 ohm resistor (not shown). This resistor loads the automatic gain control (AGC) circuits in the modulator.

K. AUTO STOP

When tape counter 37 of the machine (not shown) reaches zero and AUTO mode switch (not shown) is in the SEARCH position, terminal 79 of interlock 80 goes low initiating the same sequence as the STOP mode by a high-to-low transition.

MECHANICAL OPERATION

The tape transport mechanism shown in FIG. 2 comprises a rotating cylinder 194 housing the video record/play heads around which the tape 196 after it leaves the cassette 198 in which the supply reel 200 delivers the tape and a take-up reel 202 winds the returning tape.

After leaving the supply reel, the tape passes an erase-head 204 which erases, or removes, information on the tape during the recording mode so that blank tape is presented to the rotating cylinder 194.

The tape, after passing poles 208, 210, and 212 which guide the tape, winds around a supply tension pole 214 which senses tension of the tape during play-back and recording, and thence, around pole 216 to cylinder 194.

After leaving cylinder 194, the tape passes over the audio recording/play-back head 206 after passing pole 218, and thence, over capstan shaft 220 which drives the tape when pinch roller 222 engages the tape.

After passing over pinch roller 222, the tape is guided by return poles 224 and 226 and then over pole 228 and around pole 230, the position of which is fixed by take-up loading arm 232. The positions of poles 214 and 236 are converted to an electrical value by differential transformers 234 and 215, which converts the pole positions into electrical voltages.

The differential transformer outputs go to a servo circuit (not shown) which in turn, controls reel motor torque.

The tape continues past take-up tension pole 236 and is guided to take-up reel 202 by poles 238 and 240.

Having thus described the invention in connection with a specific preferred embodiment, other modifications will be apparent to those skilled in the art.

What is claimed is:

1. In a video tape cassette recording and reproducing device including means to transport a recording medium past recording and reproducing heads and a control system to control the speed at which said recording medium travels past the recording and reproducing heads; an improvement enabling the time for placing the recording medium in position to record and play-back and for activating such functions, to be materially reduced; comprising:
   a. means to immediately place said recording medium in a position where information can be recorded thereon or information recorded thereon can be reproduced, upon a cassette containing said recording medium being placed in said device; said means including:
      1. means to withdraw the recording medium into the device and immediately thereupon place the recording medium over the recording and reproducing heads; and
      2. means to reduce the supply tension on the recording medium to a first predetermined value upon said medium being emplaced over said recording and reproducing heads;
   b. means to restore the supply tension on the recording medium to a further predetermined value for recording and reproducing information on said recording medium and for subsequent recording and reproducing operations; and
   c. means to restore normal recording medium velocity for said recording and reproducing of information on said recording medium.

2. A video tape cassette recording and reproducing device as claimed in claim 1 in which the means to withdraw the recording medium into the device are mechanical fingers.

3. A video tape cassette recording and reproducing device as claimed in claim 1, further including means to connect the output of the reproducing head to the output of the video cassette recorder.

4. A video tape cassette recording and reproducing device as claimed in claim 3 wherein said means connects the video output to a demodulator circuit during play-back.

5. A video tape cassette recording and reproducing device as claimed in claim 1, wherein said means to place the recording medium in position includes a rotatable capstan and means to inhibit rotation of said capstan shaft with the recording medium in position around the recording and reproducing heads.

6. A video tape cassette recording and reproducing device as claimed in claim 5 wherein the capstan shaft accelerates the tape to a velocity of 9.53 cm/sec.

7. A video tape cassette recording and reproducing device as claimed in claim 5, including means to disengage a pinch roller from the capstan shaft to release the recording medium.

8. A video tape cassette recording and reproducing device as claimed in claim 7 wherein the means to disengage the pinch roller is solenoid.

9. A method of transporting a recording medium from a video tape cassette in a recording and/or reproducing device to a position where a video signal can be recorded on or reproduced from said recording medium comprising the steps of:
   a. placing the cassette in said device;
   b. withdrawing the recording medium from said cassette and immediately thereupon placing the recording medium over recording and reproducing heads;
   c. holding the recording medium at a predetermined value of tension until ready to record or reproduce information thereon;

d. increasing the tension of the recording medium to a value suitable for recording and playing back information on said recording medium;
e. moving the recording medium past the recording and reproducing heads at a given velocity; and
f. recording and/or reproducing information on said recording medium.

10. A method as claimed in claim 9 in which the tension on the recording medium while being held is approximately 3-4 grams on the supply reel side and 60-100 grams on the take-up reel side.

11. A method as claimed in claim 9 in which the tension is increased on the take-up side to approximately 75 grams.

12. A method as claimed in claim 9 in which to stop the recording medium during play-back or recording, the capstan shaft is braked to zero rotation and the tension on the recording medium reduced to about 3 to 4 grams.

13. A method of transporting a recording medium from a video tape cassette in a recording and/or reproducing device to a position where said information signal can be recorded on or reproduced from said recording medium as claimed in claim 9 in which the recording medium is accelerated to velocity of 9.53 cm/sec.

14. A method as claimed in claim 13 in which the recording medium is accelerated, from a stand-by state, to a recording/reproducing velocity of 9.53/cm/sec in approximately 250 milliseconds.

* * * * *